United States Patent [19]

Capshew

[11] 4,429,087

[45] Jan. 31, 1984

[54] POLYMERIZATION CATALYST AND PROCESS

[75] Inventor: Charles E. Capshew, Bartlesville, Okla.

[73] Assignee: Phillips Petroleum Company, Bartlesville, Okla.

[21] Appl. No.: 357,120

[22] Filed: Mar. 11, 1982

Related U.S. Application Data

[62] Division of Ser. No. 175,219, Aug. 4, 1980, Pat. No. 4,328,121.

[51] Int. Cl.$^3$ .......................... C08F 4/02; C08F 10/00
[52] U.S. Cl. ..................................... 526/119; 526/114; 526/116; 526/122; 526/124
[58] Field of Search ............... 526/116, 114, 122, 124, 526/119

[56] References Cited

U.S. PATENT DOCUMENTS

| | | | |
|---|---|---|---|
| 3,901,863 | 8/1975 | Berger et al. | 526/124 |
| 4,039,472 | 8/1977 | Hoff | 526/124 |
| 4,218,339 | 8/1980 | Zucchini et al. | 526/124 |

*Primary Examiner*—Edward J. Smith

[57] ABSTRACT

A transition metal compound such as titanium tetrahydrocarbyloxides and a metal hydrocarbyloxide compound such as magnesium hydrocarbyloxides are chemically combined to form a first catalyst component which is treated with a second catalyst component comprising an organometallic compound precipitating agent to produce an active olefin polymerization catalyst. High polymer yields are realized per gram of catalyst when the catalyst thus produced is treated with a halide ion exchanging source and used with an organometallic cocatalyst.

12 Claims, No Drawings

POLYMERIZATION CATALYST AND PROCESS

This application is a division of my copending application having Ser. No. 175,219, filed Aug. 4, 1980, now U.S. Pat. No. 4,328,121.

The invention relates to a composition of matter, a method of preparing same, catalyst, a method of producing the catalyst and a process of using the catalyst. In another aspect, the invention relates to a particularly effective ethylene polymerization catalyst and process.

In the production of polyolefins, such as, for example, polyethylene, polypropylene, ethylene-butene copolymers etc., an important aspect of the various processes and catalysts used to produce such polymers if the productivity. By productivity is meant the amount or yield of solid polymer that is obtained by employing a given quantity of catalyst. If the productivity is high enough then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary.

In addition, high productivities are desirable in order to minimize catalyst costs. Therefore it is desirable to develop new and improved catalysts and polymerization processes which provide improved polymer productivities.

Many of the prior art catalysts creat serious problems in the particle-form polymerization processes because the particle size of the polymeric product is so fine that difficulties are encountered in the separation and handling of the product; particularly, trouble occurs in the extrusion and compounding steps involved in producing a commercial product. A method has been found now to keep the high activities of certain of these new generation ethylene polymerization catalysts and yet produce polymer of sufficiently large size so that the above-referred to problem is reduced or eliminated completely.

Accordingly, an object of the invention is to provide a catalyst.

Another object of the invention is to provide a polymerization process for using a catalyst capable of providing improved polymer productivities as compared to prior art catalysts.

Another object of the invention is to provide a catalyst and a polymerization process which produces attrition resistant relatively large as formed polymer particles.

Other objects, aspects, and the several advantages of this invention will become apparent to one skilled in the art upon reading this disclosure and the appended claims.

SUMMARY OF THE INVENTION

In accordance with the invention, an active catalyst effective for the polymerization of olefin polymers at high productivity and for increasing the particle size of as formed polymer which catalyst is formed upon mixing (1) a metal hydrocarbyloxide, preferably magnesium, and (2) a transition metal hydrocarbyloxide (first catalyst component) with a precipitating agent (3) comprising an organometallic compound such as a hydrocarbylaluminum halide (second catalyst component) at a reduced temperature below about 25° C., and treating the thus formed product with a halide exchanging source comprising (4) a transition metal halide.

Further, in accordance with the invention, a method for producing the above compositions is provided.

Further, in accordance with the invention, a catalyst is provided which forms on mixing the above composition of matter and an organometallic compound as a cocatalyst component.

Further, in accordance with the invention, aliphatic mono-1-olefins are homopolymerized or copolymerized with other 1-olefins, conjugated diolefins, vinylaromatic compounds, and the like, under polymerization conditions employing the catalyst described above.

Further, in accordance with the invention, the above-described catalyst is prepared by mixing together a metal hydrocarbyloxide compound and a transition metal hydrocarbyloxide compound in a suitable solvent to produce a first catalyst component solution, the first catalyst component solution is heated, cooled, and optionally filtered in order to remove any undissolved material; a second catalyst component comprising an organometallic compound is added at a temperature below about 25° C. to the above-described first catalyst component solution in a manner so as to avoid a significant temperature rise in the solution to produce a solid catalyst in the form of a slurry with the hydrocarbon solvent; the solid catalyst is treated with a transition metal halide; and the treated solid catalyst is separated from the slurry, washed with a hydrocarbon compound and dried, wherein all the above steps are carried out in the essential absence of air and water.

DETAILED DESCRIPTION OF THE INVENTION

The present invention is based at least in part on the discovery of a novel composition of matter resulting from the chemical combination of a metal hydrocarbyloxide compound having the formula $M(OR)_2$, a transition metal hydrocarbyloxide compound, an organometallic compound precipitating agent, and a halide ion exchanging source, wherein the metal (M) of the metal hydrocarbyloxide compound is selected from Group IIA and Group IIB metals of the Mendeleev Periodic Table and wherein the transition metal of the transition metal hydrocarbyloxide compound is selected from Group IVB and Group VB transition metals of the Mendeleev Periodic Table.

Preferably, the present catalyst is formed by using a magnesium component comprising $Mg(OR)_2$ in which R is the same or different and is a hydrocarbyl group containing from 1 to about 20 carbon atoms selected from among alkyl, cycloalkyl, aryl, and combinations such as alkaryl, arylalkyl, alkylcycloalkyl, and the like.

Examples of suitable compounds include magnesium dimethoxide, magnesium diethoxide, magnesium dieicosyloxide, magnesium dicyclohexyloxide, magnesium diphenoxide, magnesium dibenzyloxide, and the like. A presently preferred group of compounds are magnesium dialkoxides in which the alkyl radical contains from 1 to about 6 carbon atoms. Most preferably, magnesium diethoxide is selected because of ready availability and particular efficacy in the catalyst composition.

The transition metal of the transition metal compound noted above is selected from Group IVB and Group VB transition metals and is generally selected from titanium, zirconium, and vanadium. Excellent results have been obtained with titanium compounds and they are preferred. Some of the transition metal compounds suitable for use in the invention include, for example, titanium tetrahydrocarbyloxides, zirconium tetrahydrocarbyloxides, and vanadium tetrahydrocarbyloxides.

The titanium tetrahydrocarbyloxides are the preferred titanium compounds because they produce excellent results and are readily available. Suitable titanium tetrahydrocarbyloxide compounds include those expressed by the general formula

wherein each R is the same as defined above and individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, and titanium tetraphenoxide.

Of the titanium tetrahydrocarbyloxides, titanium tetraalkoxides are generally preferred and titanium tetraethoxide is particularly preferred because of the excellent results obtained employing this material. Titanium tetraethoxide is also generally available at a reasonable cost.

The molar ratio of the transition metal compound to the magnesium compound can be selected over a relatively broad range. Generally, the molar ratio is within the range of about 10:1 to about 1:10, however, the most common molar ratios are within the range of about 2:1 to about 1:2. When titanium tetrahydrocarbyloxide and magnesium hydrocarbyloxides are employed to form a composition of matter of the invention, a molar ratio of titanium to magnesium of about 2:1 is presently recommended as all the magnesium compound apparently goes into solution easily.

The metal hydrocarbyloxide compound, preferably a magnesium compound, and the transition metal compound employed in the present invention to form the first catalyst component are normally mixed together by heating, e.g., refluxing, these two components together in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes, and the like. Generally, the amount of solvent or diluent employed can be selected over a broad range. Usually the amount of solvent or diluent is within the range of about 20 to about 100 cc per gram of metal hydrocarbyloxide.

The temperature employed during the heating step can also be selected over a broad range. Normally the heating temperature is within the range of about 15° C. to about 150° C. when the heating step is carried out at atmospheric pressure. Obviously the heating temperatures employed would be higher if the pressure employed is above atmospheric pressure. The pressure employed during the heating step does not appear to be a significant parameter.

In addition to the above noted solvents or diluents, more polar solvents or diluents such as nitrobenzene and halogenated hydrocarbons, e.g., methylene chloride, chlorobenzene, and 1,2-dichloroethane can be used, particularly when producing compositions of the invention having a molar ratio of the transition metal compound to the magnesium compound of other than 2:1. In addition, normal saturated alkanols, such as, for example, ethanol, n-butanol, and the like, and saturated ethers particularly saturated cyclic ethers such as, for example, tetrahydrofuran, can be used alone or in combination with the previously mentioned solvents or diluents in producing catalyst compositions according to the invention. Solvent mixtures useful to help solubilize the components employed can be readily determined by one of ordinary skill in the art. Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired. The composition of matter of the present invention thus produced and which is in solution can be recovered from the solvent or diluent by crystallation or other suitable means.

It is also emphasized that the compositions of matter of the present invention are prepared in an oxygen-free system, e.g., absence of air as well as a dry system, i.e., absence of water. Generally a dry box is employed as known in the art to prepare the compositions of the present invention usually employing a dry oxygen-free nitrogen atmosphere.

The catalysts of the present invention are made up of two components. The first catalyst component comprises a chemical combination of a metal hydrocarbyloxide, preferably magnesium, and a transition metal hydrocarbyloxide (first catalyst component) and the second catalyst component comprises an organometallic compound. Particularly effective catalysts have been obtained by treating the above-described catalyst with a halide ion exchanging source, such as for example titanium tetrahalide. For convenience, the designation "catalyst A" refers to those catalysts which have not been treated with a halide ion exchanging source and the term "catalyst B" refers to those catalysts which have been so treated. In other words, catalyst B is catalyst A which is treated with a halide ion exchanging source. It has also been found desirable to employ either catalyst A or catalyst B with a cocatalyst comprising an organometallic compound.

The metal hydrocarbyloxide compounds and the transition metal compounds suitable for producing the composition of matter of the present invention which is used as the first catalyst component of the present invention were described above as was the general and specific nature of the composition of matter. It is noted that the composition of matter of the present invention need not be recovered from the diluent or solvent, such as by crystallation, prior to using such material to produce the catalysts of the present invention. Good results have been obtained by employing the first catalyst component solution which was produced when the composition of matter was prepared as well as by employing composition of matter of the present invention recovered from the diluent or solvent.

The second catalyst component is a precipitating agent selected from the group consisting of organometallic compounds in which the metal is selected from metals of Groups I to III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as

wherein R' is an alkyl, aryl, cycloalkyl group or combinations thereof containing from 1 to about 12 carbon atoms and X is a halogen atom.

Some suitable organometallic compounds include, for example, lithium alkyl, Grignard reagents, dialkyl magnesium compounds, dialkyl zinc compounds, organoaluminum compounds, etc. The second catalyst component is generally an organoaluminum halide compound which includes, for example, dihydrocarbylaluminum monohalides of the formula $R_2AlX$, monohydrocarbylaluminum dihalides of the formula $RAlX_2$, and hydrocarbylaluminum sesquihalides of the formula $R_3Al_2X_3$ wherein each R in the above formulas is as defined before and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like.

Some metal halides and oxygen-containing halides of elements selected from Groups IIIA, IVA, IVB, VA, and VB suitable for use as the second component preferably include such as, for example, aluminum tribromide, aluminum trichloride, aluminum triiodide, tin tetrabromide, tin tetrachloride, silicon tetrabromide, silicon tetrachloride, phosphorus oxychloride, phosphorus trichloride, phosphorus pentabromide, vanadium tetrachloride, vanadium oxytrichloride, vanadyl trichloride, zirconium tetrachloride, and the like.

The hydrogen halides suitable for use as the second catalyst component include preferably such as, for example, hydrogen chloride, hydrogen bromide, and the like.

The organic acid halides suitable for use as the second catalyst component preferably include such as, for example, acetyl chloride, propionyl fluoride, dodecanoyl chloride, 3-cyclopentylpropionyl chloride, 2-naphthoyl chloride, benzoyl bromide, benzoyl chloride, and the like.

It has been discovered, however, to obtain an active ethylene polymerization catalyst for particle form polymerization which produces attrition resistant relatively large as formed ethylene polymer particles that certain conditions must be employed in forming the catalyst.

These conditions comprise (1) containing the metal hydrocarbyloxide-transition metal hydrocarbyloxide composition (first catalyst component) with a precipitating agent (second catalyst component) at a reaction temperature below about 25° C. and generally ranging from about −50° C. to about 25° C., preferably from about −30° C. to about 0° C. for a time ranging from about 0.5 hours to about 5 hours.

While it may not be necessary in all instances to employ a cocatalyst with the catalyst of the present invention, the use of cocatalysts is recommended for best results. The organometallic cocatalysts suitable for use in accordance with the invention are represented by the general formulas $R'''_3Al$, $R'''AlX_2$, $R'''_2AlX$ and $R'''_3Al_2X_3$, suitable cocatalysts also include compounds of the formula $R'''_3Al$ in which $R'''$ can be the same as R or can be an unsaturated linear or branched chain hydrocarbyl radical of 1 to about 20 carbon atoms. Of the organometallic cocatalysts, the organoaluminum cocatalysts are preferred and in addition to those described above as suitable for use as the second component of the catalyst the additional organoaluminum compounds of the formula $R'''_3Al$ include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The metal hydrocarbyloxide compound/transition metal compound solution (first catalyst component) described above (which is formed by dissolving the recovered composition of matter of the present invention in a suitable solvent or which is formed initially without recovering the composition of matter from the solvent) is then contacted with hydrocarbon solution containing a precipitating agent of the second catalyst component at a temperature below about 25° C. A solid reaction product is formed which precipitates out of the solution.

The molar ratio of the transition metal compound of the first catalyst component to the precipitating agent of the second catalyst component can be selected over a relatively broad range. Generally, the molar ratio of the transition metal of the first catalyst component to the precipitating agent of the second catalyst component is within a range of from about 10:1 to about 1:10 and more generally within a range of about 2:1 to about 1:3 since a molar ratio within the latter range usually produces a catalyst which can be employed as an active ethylene polymerization catalyst.

Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. After completing the mixing, the resulting slurry is stirred or agitated for a sufficient time, generally within a range of about 5 minutes to about 5 hours, to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes, and the like, to remove any soluble material which may be present. The product is then dried and stored under dry nitrogen. The products formed in this manner are designated as catalyst A as previously described.

In another aspect of the invention, the catalyst, previously designated as catalyst A, is treated with a halide ion exchanging source such as, for example, a halide of a transition metal in order to produce a catalyst of enhanced activity, referred to previously as catalyst B. Some examples of suitable halide ion exchanging sources are titanium tetrachloride, vanadium oxychloride ($VOCl_3$), and zirconium tetrachloride. Because titanium tetrachloride is readily available and produced excellent results after extensive experimentation, it is preferred.

Generally, treating the catalyst with the halide ion exchanging source takes place in a suitable diluent such as a hydrocarbon diluent, for example, n-pentane, n-heptane, cyclohexane, benzene, xylenes, and the like, to facilitate the treating process. The treating temperature can be selected over a relatively broad range and is normally within a range of about 0° to about 150° C. The treating time can also be selected over a broad range and generally is within the range of about 10 minutes to about 10 hours. While the weight ratio of the halide ion exchanging source to catalyst A can be selected over a relatively broad range, the weight ratio of the halide ion exchanging source to catalyst A is generally within a range of about 10:1 to about 1:10 and more generally from about 7:1 to about 1:4. Following the treatment of catalyst A with the halide ion exchanging source the surplus halide ion exchanging source (the halide ion exchanging source which is not bound to catalyst B) is removed by washing catalyst B with a dry (essential absence of water) liquid such as a hydrocarbon of the type previously disclosed, n-hexane, for example. The resulting product, catalyst B, after drying, is stored under dry nitrogen.

It has been found that catalyst B can be stored for a month or longer without any significant decrease in activity.

If desired, catalyst A or catalyst B can be admixed with a particulate diluent such as, for example, silica, silica-alumina, silica-titania, magnesium dichloride, magnesium oxide, polyethylene, polypropylene, and poly(phenylene sulfide), prior to using the catalyst in a polymerization process. While the weight ratio of the particulate diluent to catalyst can be selected over a relatively wide range, the weight ratio of particulate diluent to catalyst is within the range of about 20:1 to about 2:1 and use of a particulate diluent has been found effective to facilitate charging of the catalyst to the reactor.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1.

A variety of polymerizable compounds are suitable for use in the process of the present invention. Olefins which can be polymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process or a solution form process. Aliphatic mono-1-olefins can be copolymerized with other 1-olefins and/or with other smaller amounts of other ethylenically unsaturated monomers, such as butadiene-1,3, isoprene, pentadiene-1,3, styrene, alpha-methylstyrene, and similar ethylenically unsaturated monomers which do not impair the catalyst.

In one aspect of the invention, the catalysts of the present invention have been found to be particularly effective for polymerization of mono-1-olefins such as ethylene as high productivities have been obtained and thus mono-1-olefins such as ethylene are the preferred monomers for use with the catalysts of the present invention.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane, for example. When the catalyst and cocatalyst are employed, either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the ethylene is then admitted and maintained at a partial pressure within a range of about 5/10 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds, and hydrogen if any and in any desirable order. The reactor product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, extrusion of film, and the like. For example, polyethylene made with the catalysts of this invention is typically of narrow molecular weight distribution which is especially desirable for injection molding applications. Furthermore, the polyethylene produced as described generally has a desirable high bulk density of about 0.44 g/cc as recovered from the polymerization zone. In addition, the polyethylene produced as described is characterized by a high degree of stiffness, e.g., high flexural modulus, which is also desirable in many applications.

EXAMPLE 1,

Catalyst Preparation (Catalyst A)

A stock solution of the reaction product of titanium tetra-n-butoxide and magnesium diethoxide for subsequent use was prepared as follows. In a dry box, a 10 ounce beverage bottle was charged with 13.25 g (0.0389 mole) of the titanium alkoxide and 9.16 g (0.0800 mole) of the magnesium alkoxide to form a slurry. The bottle was capped, removed from the dry box, and injected with 20 mL of dry n-heptane. The bottle was placed in a bath at 95° C. and the slurry was stirred with continued heating of the bath for 2½ hours. The final temperature was 146° C. The bottle was removed from the bath, cooled to room temperature and returned to the dry box where the opaque solution was suction filtered to obtain a clear solution. The stock solution was divided into two equal portions and stored in glass containers.

Each stock solution was removed in its container from the dry box and treated with the specified quantity of a solution of ethylaluminum dichloride in n-hexane (1.49 molar) added dropwise for the specified time and temperature to effect the reaction. The bottle containing the solid particulate precipitate was transferred to the dry box where the precipitate was isolated by filtration, washed with 100 mL of dry n-hexane, and dried under an argon stream to a constant weight.

The reaction conditions employed and results obtained are given in Table I.

TABLE I

| Preparation of Catalyst A | | |
|---|---|---|
| Catalyst Designation | A-1 | A-2 |
| Stock Solution of Mg(OEt)$_2$ - Ti(OC$_4$H$_9$)$_4$ g (calculated) | 17.8 | 17.8 |
| Moles of Ti(OC$_4$H$_9$)$_4$ (calculated) | 0.19 | 0.19 |
| Reaction Conditions | | |
| medium used | n-hexane | n-hexane |
| ethylaluminum dichloride (EADC) | | |
| mL | 57.0 | 57.0 |
| mole | 0.170 | 0.170 |
| temperature, °C. | 25 | −20 |
| time, hours | 4 | 3.5 |
| Wash liquid | n-hexane | n-hexane |
| mL | 100 | 100 |
| Mole Ratios | | |
| Ti(OC$_4$H$_9$)$_4$/Mg(OEt)$_2$ | 0.49:1 | 0.49:1 |
| Ti(OC$_4$H$_9$)$_4$/EADC | 1.1:1 | 1.1:1 |
| Recovered Product | | |
| color | tan-brown | brown |
| grams | 7.38 | 4.87 |

EXAMPLE 2,

Catalyst Preparation

Catalyst B

A series of catalysts was prepared from catalyst A-1 and catalyst A-2 by charging individual portions to green colored 10 ounce pop bottles along with 10 mL of dry n-hexane and a magnetic stirring bar. Each bottle was capped, removed from the dry box and treated with the specified quantity of chloride treating agent (titanium tetrachloride or anhydrous hydrogen chloride) for the specified time and temperature while being stirred. After the treatment each bottle was allowed to return to room temperature (about 23° C.) and then returned to the dry box. The solid product was recovered by filtration, washed with 100 mL of dry n-hexane and dried under an argon stream to a constant weight.

The reaction conditions employed and results obtained are given in Table II.

TABLE II

| Preparation of Catalyst B | | | | | | | | | | |
|---|---|---|---|---|---|---|---|---|---|---|
| Catalyst Designation | Catalyst A No. | Grams | Chloride Treating Agent (CTA) Name | Grams | Wt. Ratio CTA/Cat. A | Reaction Conditions Temp. °C. | Time, Min. | Recovered Product Color | Grams | Remarks |
| B-1 | A-1 | 1.6 | HCl[a] | —[c] | — | 25 | 60 | brown | 1.15 | control |
| B-2 | A-1 | 1.6 | TiCl$_4$ | 8.63 | 5.4:1 | 25 | " | " | 1.63 | invention |
| B-3 | A-1 | 1.6 | " | " | " | 100 | " | " | 1.98 | " |
| B-4 | A-2 | 1.6 | HCl[b] | — | — | 25 | " | lt. tan | 1.26 | control |
| B-5 | A-2 | 1.2 | TiCl$_4$ | 8.63 | 7.2:1 | 25 | " | tan-br. | 0.94 | invention |
| B-6 | A-2 | 1.2 | " | " | " | 100 | " | " | 1.24 | " |

Notes:
[a]Bubbled in HCl gas. Then flushed system with dry nitrogen, added about 50 mL of dry n-hexane, and filtered off the product.
[b]Bubbled in HCl gas as before. Dilution of sample and hexane wash was not employed.
[c]A dash signifies no determination was made.

EXAMPLE 3

Ethylene Polymerization

A 3.8 liter, stirred, stainless steel reactor was employed for ethylene polymerization. The reactor was conditioned for each run by charging to it 3 liters of dry n-heptane, closing the port, and heating the reactor and contents at 175° C. for 30 minutes. The reactor was drained and residual heptane purged with dry nitrogen. The reactor was then closed and cooled under nitrogen pressure.

The conditioned reactor for each run was purged with dry isobutane vapor and 1 mL of the cocatalyst solution containing 15 wt. % triethylaluminum (TEA) in dry n-heptane (0.93 mmoles TEA) was charged followed by addition of the catalyst. The reactor was closed, about 2 liters of dry isobutane was charged, the reactor and contents were heated to 100° C. and the hydrogen and ethylene admitted to start the run. Unless indicated to the contrary a run time of 60 minutes was employed.

Each run was terminated by flashing the ethylene and isobutane and hydrogen, if present, from the reactor. The polymer was then recovered, dried and weighed to obtain the yield.

Each polymer yield was divided by the weight of catalyst employed to determine the calculated catalyst productivity which is expressed as kilograms (kg) polyethylene per gram (g) catalyst per hour. In some runs of less than 60 minutes duration, a productivity figure is calculated for 60 minutes in which the reasonable assumption is made based on past experience that the activity of the catalyst remains unchanged during at least the first 60 minutes of each run. When the catalyst is diluted, a calculated productivity based on kg polyethylene produced per gram diluted catalyst per hour is given as well as kg polyethylene produced per gram catalyst contained in the mixture per hour.

The particle size distribution of the recovered polymer ground in a Waring Blender at high speed for 2 minutes was determined by placing about 100 grams of the polymer on a set of mechanically agitated sieves. The set consisted of sieves (U.S. Sieve Series) having mesh sizes of 30, 50, 80, 100, 200, and bottom pan. Agitation was conducted for 15 minutes and the amount of polymer remaining on each sieve and in the pan was determined by weighing. The purpose of grinding the as made polymer is to simulate the attrition polymer particles appear to receive in a large scale reactor such as a loop reactor since polymer particles formed in a commercial reactor are generally finer than those made on the bench scale.

In each run, the initial ethylene partial pressure was 1.4 MPa, the initial hydrogen partial pressure was 0.69 MPa and the average reactor pressure during the run was 3.59 MPa.

The amount of catalyst employed in each run and the results obtained are presented in Table III.

activity but that it produces a lesser amount of coarse polymer. The amount of coarse polymer produced by the invention catalyst can be substantially increased over that in invention run 3 by a combination of a $-25°$ EADC contacting treatment and a 100° C. TiCl$_4$ treatment. However, catalyst activity is decreased. Optimization of the treating conditions should afford invention catalysts demonstrating good activity as well as the capability for producing good yields of coarse polymer.

Microphotographs of the polymer particles produced in control run 4 and in invention run 5 show that the polymer produced with the invention catalyst is essentially solid in nature. In contrast, the polymer produced with the control catalyst appears to be a tangled mass of small strands. The catalysts produce polymer particles basically different in appearance and each catalyst therefore differs from one another in some subtle fashion.

I claim:

1. A polymerization process comprising contacting at least one aliphatic mono-olefin under polymerization conditions in the presence of a catalyst which is formed by
    (1) mixing together a first catalyst component comprising a metal hydrocarbyloxide compound having the formula M(OR)$_2$) where M is a metal se-

TABLE III

Effect of Catalyst Formation Conditions on Polymer Particle Size and Productivity

| | Catalyst Formation | | | Catalyst | | Calculated | Polymer | | | | | |
|---|---|---|---|---|---|---|---|---|---|---|---|---|
| Run No. | EADC °C. | HCl °C. | TiCl$_4$ °C. | No. | Weight Grams | Productivity Kg/g/hr$^{(a)}$ | Yield Grams | Wt. % 50 Mesh | Coarser Than 100 Mesh | Melt Index | HLMI MI | Remarks |
| 1 | 25 | 25 | (b) | B-1 | 0.0183 | 17.3 | 317 | 9.1 | 54.1 | 37 | 22 | Control |
| 2 | 25 | — | 25 | B-2 | .0171 | 32.2 | 550 | 14.7 | 54.3 | 31 | 31 | Invention |
| 3 | 25 | — | 100 | B-3 | .0154 | 14.8 | 228 | 38.5 | 76.2 | 7.8 | 33 | " |
| 4 | −20 | 25 | — | B-4 | .0155 | 8.58 | 133 | 75.9 | 93.3 | 8.1 | 30 | Control |
| 5 | −20 | — | 25 | B-5 | .0146 | 27.3 | 398 | 25.0 | 72.8 | 31 | 32 | Invention |
| 6 | −20 | — | 100 | B-6 | .0302 | 6.19 | 187 | 86.4 | 97.1 | 11 | 35 | " |
| 7 | −20 | — | 100 | B-6 | .0187 | 6.47 | 121 | 84.9 | 96.8 | 4.2 | 29 | " |

Notes:
$^{(a)}$kilograms polymer per gram catalyst per hour
$^{(b)}$dash signifies no determination Control runs 1 and 4 are included because of U.S. Pat. No. 4,039,472 which issued Aug. 2, 1977 to Glen R. Hoff. The reference discloses that Mg(OR)$_2$—Ti(OR)$_4$ can be contacted with one of EADC, EASC, etc., at about 20°–70° C. and the resulting solid product can be treated with dry HCl at about 20°–70° C. to produce a catalyst. The results show that catalyst productivity is higher and the quantity of coarse polymer particles is lower when Mg(OR)$_2$—Ti(OR)$_4$ is contacted at about 25° C. with EADC. When the contacting occurs at about −20° C., catalyst productivity is reduced about 50% while the amount of coarse polymer is substantially increased.

In comparing invention runs 2 and 5 and in view of control runs 1 and 4, the following conclusions can be inferred. The invention catalyst used in run 2 is considerably more active than the control catalyst used in run 1 although each catalyst produces about the same ratio of coarse polymer of total polymer produced. The results of invention runs 2 and 3 demonstrate that the activity of the catalyst is diminished when a TiCl$_4$ treating temperature of 100° C. is used rather than a 25° C. treating temperature. However, the quantity of coarse polymer is substantially increased by the higher catalyst treating temperature.

In comparing invention run 5 with control run 4 it is apparent that the invention catalyst is much higher in lected from Group IIA and Group IIB of the Mendeleev Periodic Table and R is the same or different and is a hydrocarbyl group having from 1 to 20 carbon atoms and a transition metal hydrocarbyloxide compound in which the transition metal is selected from the group consisting of Group IVB and Group VB transition metals of the Mendeleev Periodic Table and wherein the hydrocarbyl group is as defined above in a molar ratio of transition metal compound to metal compound ranging from about 2:1 to about 1:2, (2) heating the first catalyst component solution formed in (1), (3) cooling the first catalyst component solution to a temperature below about 25° C. and optionally filtering the first catalyst component solution to remove any undissolved material from the cooled first catalyst component solution, (4) adding a precipitating agent comprising a second catalyst component in a molar ratio of transition metal compound to the precipitating agent within a range of about 2:1 to about 1:3 to the cooled first catalyst component solution which is at a temperature ranging from about −50° C. to about 25° C. under conditions so as to avoid a significant temperature rise in the solution and to produce a solid catalyst in the form of a slurry with the solvent, said second catalyst component comprising an organoaluminum halide represented by the formulas R Al X$_2$ R$_2$ Al X, and R$_3$ Al$_2$ X$_3$ wherein each R in the above formulas is as defined before and each R can be the same or different, and X is a halogen atom,
  (5) washing and drying the solid catalyst component thus formed and contacting same with a transition metal halide ion exchange source selected from titanium tetrachloride, vanadium oxychloride (VOCl$_3$), and zirconium tetrachloride in a weight ratio of transition metal halide to said solid catalyst component ranging from about 7:1 to about 1:4,
  (6) separating the solid catalyst component formed in (5) and washing same, and,
  (7) combining the washed and dried solid catalyst component separated in (6) with a cocatalyst component comprising an organoaluminum compound.

2. A process according to claim 1 wherein the polymerizable compound comprises at least about 90 weight percent ethylene.

3. A process according to claim 1 wherein said polymerizable compound is essentially ethylene.

4. A process according to claim 1 wherein the polymerization temperature is within the range of about 50° C. to about 120° C., the partial pressure of the polymerizable compound is within the range of about 0.5 MPa to about 5 MPa (70–725 psig).

5. A process according to claim 1 further comprising a cocatalyst which comprises at least one organoaluminum compound represented by the general formulas R'''$_3$Al, R'''AlX$_2$, R'''$_2$AlX, and R'''$_3$Al$_2$X$_3$ wherein R''' is individually selected from linear and branched chain hydrocarbyl radicals containing from 1 to about 20 carbon atoms for radical and each R' can be the same or different and X is a halogen atom.

6. A process according to claim 1 wherein the catalyst is formed from magnesium diethoxide (1), titanium tetrabutoxide (2), and ethylaluminum dichloride (precipitating agent), and the halide ion exchanging source is titanium tetrahalide.

7. A process according to claim 6 further comprising a cocatalyst which is triethylaluminum.

8. A process according to claim 1 wherein the resulting catalyst formed in (4) is contacted with a halide ion exchange source selected from titanium tetrachloride, vanadium oxychloride (VOCl$_3$), and zirconium tetrachloride in a hydrocarbon diluent at a temperature within the range of about 0° C. to about 150° C.

9. A process according to claim 8 wherein said first and second catalyst components are formed from magnesium diethoxide, titanium tetra-n-butoxide, and ethylaluminum dichloride, and the halide ion source is titanium tetrachloride.

10. A process according to claim 9 wherein the polymerizable compound is ethylene and the catalyst further comprises a triethylaluminum cocatalyst.

11. A process according to claim 1 comprising
  contacting ethylene under polymerization conditions with a catalyst which forms on mixing a first catalyst component and a second catalyst component,
  wherein the first catalyst component is formed by mixing magnesium diethoxide and titanium tetra-n-butoxide,
  wherein said second catalyst component is ethylaluminum dichloride,
  wherein the catalyst is treated with titanium tetrachloride, and
  wherein said contacting is carried out employing a triethylaluminum cocatalyst.

12. A process according to claim 11 wherein the first and second catalyst components are mixed at a temperature within the range of from about −50° C. to about 25° C. and the resulting catalyst is treated with titanium tetrachloride at a temperature within the range of 0° C. to 150° C.

* * * * *